(12) United States Patent
Sanchez (10) Patent No.: US 12,092,894 B2
(45) Date of Patent: Sep. 17, 2024

(54) ARRANGEMENT FOR MOUNTING AN OPTICAL SYSTEM ON A BODY ELEMENT OF A VEHICLE

(71) Applicant: A. RAYMOND ET CIE, Grenoble (FR)

(72) Inventor: Anthony Sanchez, Saint-Martin-le-Vinoux (FR)

(73) Assignee: A. Raymond et Cie, Grenoble (FR)

( * ) Notice: Subject to any disclaimer, the term of this patent is extended or adjusted under 35 U.S.C. 154(b) by 110 days.

(21) Appl. No.: 17/595,487

(22) PCT Filed: Mar. 31, 2020

(86) PCT No.: PCT/EP2020/059082
§ 371 (c)(1),
(2) Date: Nov. 17, 2021

(87) PCT Pub. No.: WO2020/233879
PCT Pub. Date: Nov. 26, 2020

(65) Prior Publication Data
US 2022/0214517 A1    Jul. 7, 2022

(30) Foreign Application Priority Data
May 17, 2019    (FR) ...................................... 1905178

(51) Int. Cl.
*G02B 7/02*    (2021.01)
*B60R 11/00*    (2006.01)
(Continued)

(52) U.S. Cl.
CPC .............. *G02B 7/021* (2013.01); *B60R 11/04* (2013.01); *B60S 1/46* (2013.01); *B60S 1/56* (2013.01);
(Continued)

(58) Field of Classification Search
None
See application file for complete search history.

(56) References Cited

U.S. PATENT DOCUMENTS

| 5,950,017 A * | 9/1999 | Reff ....................... G03B 17/12 |
| | | 396/419 |
| 9,864,258 B1 * | 1/2018 | McVicker ............... B63C 11/22 |
| | (Continued) | |

FOREIGN PATENT DOCUMENTS

| CN | 201159229 | 12/2008 |
| CN | 201897051 | 7/2011 |
| | (Continued) | |

OTHER PUBLICATIONS

Chinese Office Action for Application No. 202080035277.1 dated Mar. 31, 2023, 20 pages with machine translation.
(Continued)

*Primary Examiner* — Ricky Chin
(74) *Attorney, Agent, or Firm* — TraskBritt (57) ABSTRACT

An arrangement is used for mounting an optical system on a body element of a vehicle. The optical system includes an image capturing device and a device for projecting a fluid for cleaning the image capturing device. The arrangement comprises a housing element for holding the image capturing device in the mounting position; a holding element of the fluid projection device for placing the latter in a functional position with respect to the image capturing device disposed in the mounting position; and a fastening element, on which the housing element and the holding element are mounted. The fastening element is intended to be fastened to the body element of the vehicle.

15 Claims, 7 Drawing Sheets

(51) Int. Cl.
*B60R 11/04* (2006.01)
*B60S 1/46* (2006.01)
*B60S 1/56* (2006.01)
*H04N 23/55* (2023.01)

(52) U.S. Cl.
CPC ...... *H04N 23/55* (2023.01); *B60R 2011/0071* (2013.01); *B60R 2011/0077* (2013.01); *B60R 2011/0085* (2013.01)

(56) References Cited

U.S. PATENT DOCUMENTS

| | | | |
|---|---|---|---|
| 10,462,428 B1* | 10/2019 | Grabow | H04N 5/77 |
| 2005/0239326 A1 | 10/2005 | Ishikura et al. | |
| 2009/0129769 A1* | 5/2009 | Broberg | F16M 11/10 |
| | | | 396/428 |
| 2009/0187300 A1* | 7/2009 | Everitt | G01C 21/3602 |
| | | | 701/119 |
| 2015/0015713 A1* | 1/2015 | Wang | B60R 11/04 |
| | | | 348/148 |
| 2015/0078940 A1* | 3/2015 | Kikuta | F04B 17/03 |
| | | | 417/443 |
| 2015/0097013 A1* | 4/2015 | Rawlings | H04N 23/57 |
| | | | 224/567 |
| 2015/0203077 A1* | 7/2015 | Gokan | B05B 7/08 |
| | | | 134/102.2 |
| 2015/0296108 A1* | 10/2015 | Hayakawa | G02B 7/02 |
| | | | 348/148 |
| 2015/0343999 A1* | 12/2015 | Lopez Galera | B60S 1/0848 |
| | | | 134/30 |
| 2016/0272163 A1* | 9/2016 | Dreiocker | H04N 23/811 |
| 2016/0339875 A1* | 11/2016 | Ina | B60S 1/522 |
| 2016/0349601 A1* | 12/2016 | Kungl | G03B 17/14 |
| 2017/0036647 A1* | 2/2017 | Zhao | G02B 27/0006 |
| 2018/0078974 A1* | 3/2018 | Karasik | G02B 27/0006 |
| 2018/0079392 A1* | 3/2018 | Karasik | B60S 1/52 |
| 2018/0345917 A1 | 12/2018 | Yamamoto et al. | |
| 2019/0028618 A1 | 1/2019 | Bippus et al. | |
| 2019/0337466 A1 | 11/2019 | Oba | |
| 2019/0351840 A1 | 11/2019 | Kasarla et al. | |
| 2019/0375378 A1* | 12/2019 | Nezu | H04N 23/00 |
| 2020/0231215 A1* | 7/2020 | Tsutsumi | B62D 21/152 |
| 2020/0254980 A1* | 8/2020 | Kondo | B60S 1/54 |
| 2020/0275004 A1* | 8/2020 | Condron | G02B 27/0006 |
| 2020/0290075 A1* | 9/2020 | Nezu | B05B 1/083 |
| 2020/0324738 A1 | 10/2020 | Kubota et al. | |
| 2021/0031729 A1* | 2/2021 | Matsunaga | B60S 1/56 |
| 2021/0070257 A1* | 3/2021 | Kondo | B60S 1/54 |
| 2021/0094515 A1* | 4/2021 | Sato | H04N 23/55 |
| 2021/0370843 A1* | 12/2021 | Hart | B60R 11/04 |
| 2021/0389171 A1* | 12/2021 | Eide | G01G 23/3735 |
| 2022/0055045 A1* | 2/2022 | Picot | B60S 1/56 |
| 2022/0214517 A1* | 7/2022 | Sanchez | B60R 11/04 |
| 2022/0294936 A1* | 9/2022 | Espinosa Morales | B60R 11/04 |

FOREIGN PATENT DOCUMENTS

| | | |
|---|---|---|
| CN | 202302636 | 7/2012 |
| CN | 204978460 | 1/2016 |
| CN | 106536285 A | 3/2017 |
| CN | 109278897 A | 7/2017 |
| CN | 207410420 | 5/2018 |
| CN | 109109823 A | 1/2019 |
| EP | 3149433 B1 | 4/2015 |
| EP | 2873571 B1 | 10/2016 |
| WO | 2018/043743 A1 | 8/2018 |

OTHER PUBLICATIONS

International Search Report for International Application No. PCT/EP2020/059082 dated Apr. 24, 2020, 2 pages.
International Written Opinion for International Application No. PCT/EP2020/059082 dated Apr. 24, 2020, 5 pages.
Chinese Office Action for Application No. 202080035587.3 dated Apr. 7, 2023, 18 pages with machine translation.
European Communication pursuant to Article 94(3) EPC for European Application No. 20714227, dated Oct. 18, 2022, 5 pages.
European Communication pursuant to Article 94(3) EPC for European Application No. 20714228, dated Oct. 18, 2022, 4 pages.

* cited by examiner

ARRANGEMENT FOR MOUNTING AN OPTICAL SYSTEM ON A BODY ELEMENT OF A VEHICLE

CROSS-REFERENCE TO RELATED APPLICATIONS

This application is a national phase entry under 35 U.S.C. § 371 of International Patent Application PCT/EP2020/059082, filed Mar. 31, 2020, designating the United States of America and published as International Patent Publication WO 2020/233879 A1 on Nov. 26, 2020, which claims the benefit under Article 8 of the Patent Cooperation Treaty to French Patent Application Serial No. 1905178, filed May 17, 2019.

TECHNICAL FIELD

The present disclosure relates to an arrangement for mounting an optical system on a body element of a vehicle.

BACKGROUND

It is increasingly common to equip vehicles, in particular, motor vehicles, with image capturing devices. This may thus be a reversing camera integrated into the rear trunk door of the vehicle or its cowl, or integrated into an exterior mirror to provide rear side images of the environment. Document EP3149433 proposes a mounting arrangement for such a device. It can also be a remote sensing laser device (generally designated by the acronym "LIDAR") or an infrared image sensor.

In document US2019028618, an image capturing device is described that is intended to equip a motor vehicle. This device is supplied in a modular and compact form to be integrated into all types of body elements. The modular device consists of a plastic case holding an optic. The case comprises and protects an integrated electronic image sensor arranged on a printed circuit, facing the optic. The case is closed by a cover carrying an electrical connector. This connector is electrically connected to the printed circuit and can meet a connection standard, for example, FAKRA, facilitating its electrical connection to a vehicle computer, via a standard connection cable.

The optic of an image capturing device, such as those described in the preceding documents, is liable to be soiled by rain, splashes or dust, which leads to a degradation in the quality of the images provided and which may pose safety concerns. To solve this problem, provision has been made to place a device for projecting a cleaning fluid on the vehicle and in the immediate vicinity of the optic of the image capturing device. By projecting this fluid (a liquid or compressed air) as needed onto the optic of the image capturing device, the aim is to eliminate the particles or the material that is obstructing the optic in order to regain satisfactory image quality. Such a solution is described, in particular, in documents WO2018043743, US20180345917 and EP2873571, in which the cases of the image capturing device and the fluid projection device are directly assembled to a support.

BRIEF SUMMARY

It is generally sought to simplify the assembly of the parts making up a vehicle, and, in particular, those to be placed on body elements of this vehicle. The present disclosure aims to provide an arrangement facilitating the mounting of an optical system composed of an image capturing device and of a device for cleaning this device.

With a view to achieving this aim, the object of the present disclosure provides an arrangement for mounting an optical system on a body element of a vehicle, the optical system comprising an image capturing device comprising a case and a device for projecting a fluid for cleaning the image capturing device, the arrangement comprising:
- a housing element for holding the case of the image capturing device in the mounting position;
- a holding element of the fluid projection device;
- a fastening element, on which the housing element and the holding element are mounted so that the fluid projection device is arranged in a functional position with respect to the image capturing device when the latter is in the mounting position, wherein the fastening element is intended to be fastened to the body element of the vehicle.

According to other advantageous and non-limiting features of the present disclosure, taken alone or in any technically feasible combination:
- the housing element has a side wall in which is arranged at least one flexible tab having a free end bearing a notch, the flexible tab being able to deform to allow the introduction of the optical image capturing device in the housing element and to close the notch thereon when it is disposed in the mounting position;
- the housing element and the holding element are part of the same main body;
- the fastening element is carried by an intermediate part fastened in a reversible manner to the main body;
- the intermediate part comprises two parts connected by a connecting ring, each part being configured to slide in an assembly rail arranged on the main body;
- the fastening element and the holding element are carried by an intermediate part reversibly fastened to the housing element;
- the intermediate part is irreversibly fastened to the body element;
- the fastening element comprises a plurality of metal clips configured to cooperate with holding elements provided on the body element of the vehicle;
- the fastening element comprises an adhesive material disposed on the intermediate part;
- the intermediate part comprises elements for adjusting the angular position of the housing element;
- the housing element and the fastening element are connected via a hinge;
- the mounting arrangement comprises a removable adjustment device for orienting the housing element with respect to the fastening element at a determined angle;
- the housing element is provided with an electrical interface configured to couple with an electrical connector of the image capturing device when the latter is retained in the mounting position;
- the housing element has a bottom and the electrical interface comprises a connector disposed on the bottom of the housing element.

BRIEF DESCRIPTION OF THE DRAWINGS

Other features and advantages of the present disclosure will become apparent from the detailed description of the present disclosure that follows with reference to the accompanying figures, in which.

DETAILED DESCRIPTION

In the remainder of this description, the term "optical system" will denote the assembly including an image capturing device 2' and a fluid projection device 3' that it is sought to assemble to a body element of a vehicle. Additionally, the term "image capturing device" denotes any device capable of forming a representation of the environment of the vehicle; it may, in particular, be an image sensor in the visible range, or in the infrared, or in any other wavelength range. It can also be a laser-based device, such as a LIDAR, as previously discussed. In all cases, the image capturing device comprises a case, for example, made of plastic, retaining an optic. The case comprises and protects the sensor arranged on a printed circuit, facing the optic. The case is closed by a cover carrying an electrical connector. This connector is electrically connected to the printed circuit.

In the chosen approach, the optical system can be pre-mounted on an arrangement 1 in order to facilitate its assembly to the body element. For this purpose, the body element is provided with a main opening configured to receive the optic of the image capturing device 2'. It can also be provided with another opening to receive a nozzle from the projection device 3' when the latter cannot be placed in the main opening.

Very generally, and with reference to the figures, a mounting arrangement 1 of the optical system in accordance with the different embodiments making up the present description comprises:
- a housing element 2 for retaining an optical image capturing device 2;
- a holding element 3 of a fluid projection device 3';
- a fastening element 4 on which the housing element 2 and the holding element 3 are mounted, the fastening element being intended to be fastened to a body element of a vehicle.

The image capturing device 2' can be fastened by any means to the housing element 2, for example, by clipping, snap-fastening, elastic fitting, by stapling or by screwing, in order to retain it in this mounting position. For this purpose, provision can be made for the case of the image capturing device to be provided with means facilitating or allowing its fastening to the housing element 2.

Figure 2A:
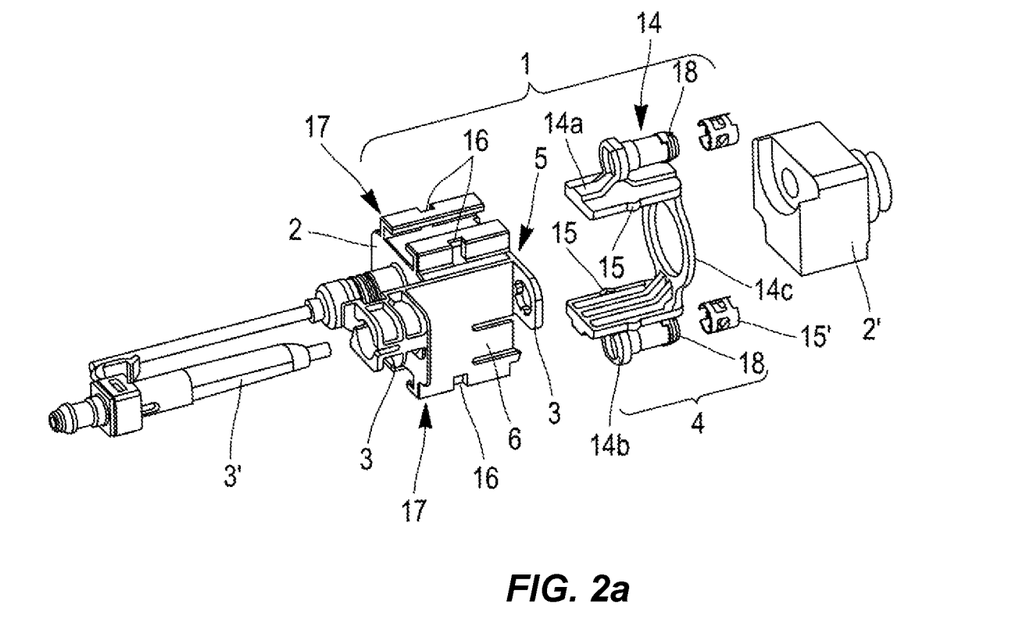
FIGS. 2a to 2d show a mounting arrangement according to another embodiment.
Figure 3A:
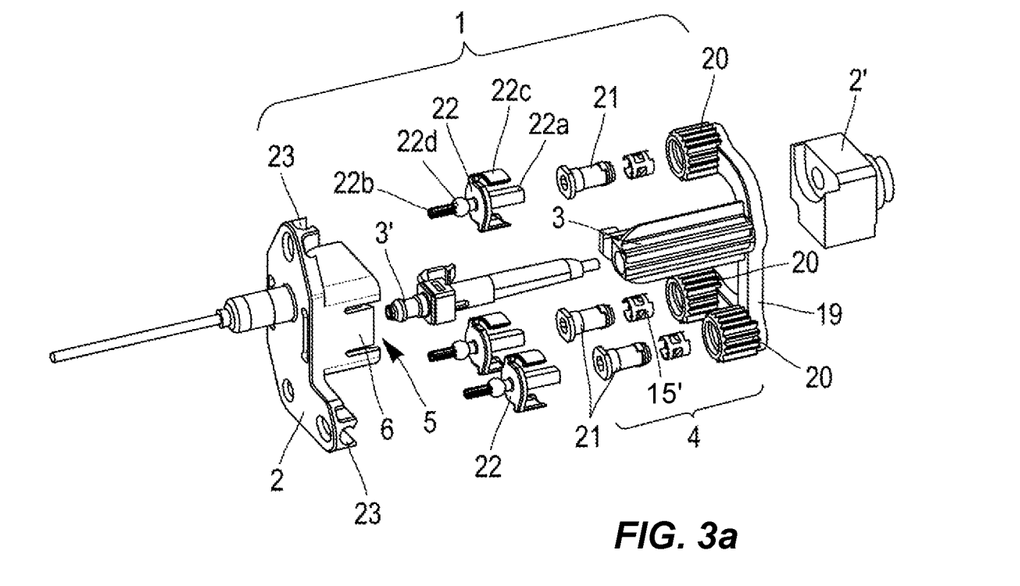
FIGS. 3a to 3d show a mounting arrangement according to yet another embodiment.
Figure 3B:
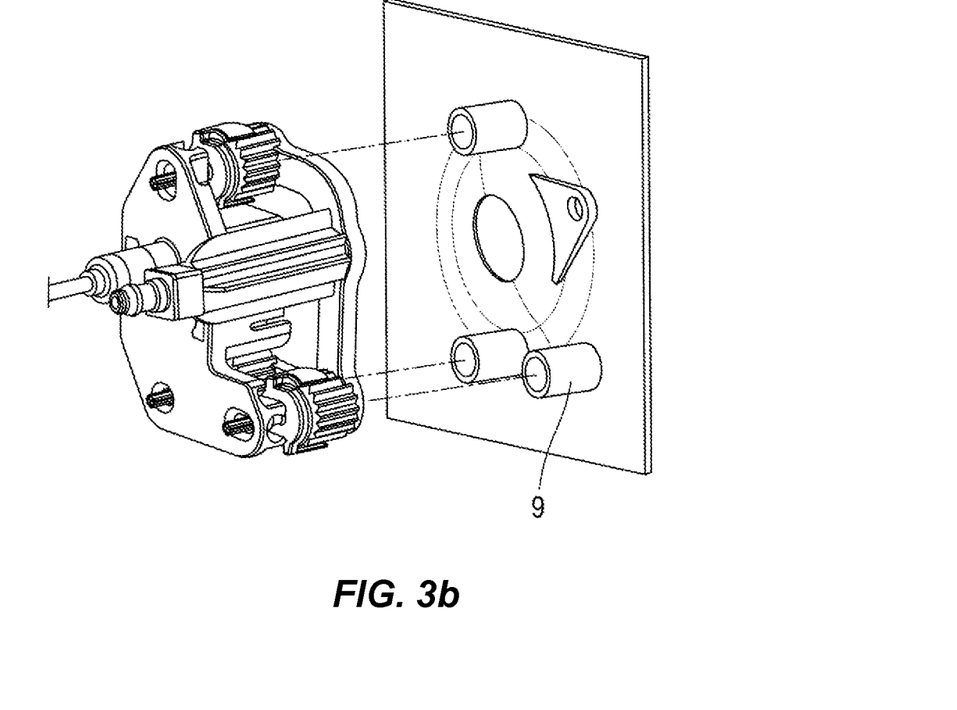
Figure 3C:
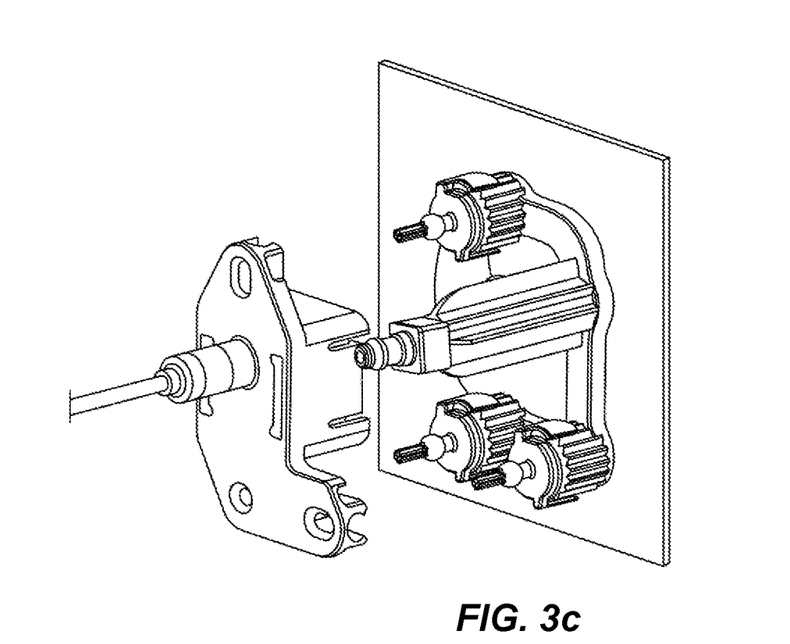
Figure 4:
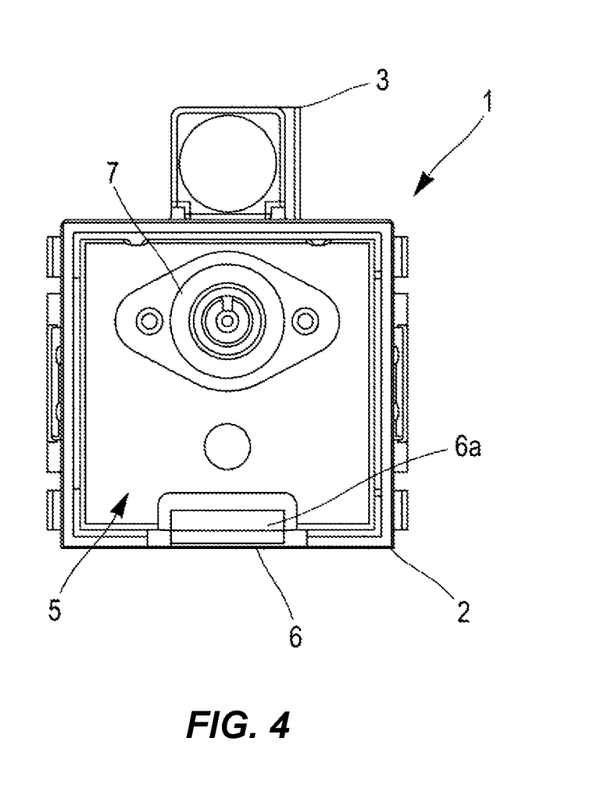
FIG. 4 shows a front view of a main body formed by a housing element and a holding element.

In some embodiments, shown, for example, in FIG. 2a, 3a or 4, the housing element 2 is formed by side walls defining a housing 5 in which the image capturing device 2' can be placed, in the mounting position. The housing element 2 of these embodiments may have a flexible tab 6 arranged on one of the side walls of the housing 5. The flexible tab 6 carries a notch 6a at its free end, the notch being oriented toward the inside of the housing 5. The flexible tab 6 can be deformed toward the outside of the housing to allow the image capturing device 2' to be introduced into the housing 5 and to close on the latter when it is placed in the mounting position. In this position, provision can be made for an electrical connector of the optical image capturing device 2' to be coupled to an electrical interface 7 with which the housing element 2 can be provided.

When such an electrical interface 7 is provided in the housing element 2, and as can be seen in FIG. 4, it has a first side, emerging inside the housing 5, allowing it to be connected to the electrical connector of the image capturing device 2' when the latter is retained by the housing element 2. The electrical interface 7 may comprise a connector arranged on a wall forming the bottom of the housing element 2. The electrical interface 7 also comprises a second side, emerging outside the housing 5, allowing it to be connected to connection cables, in order to electrically connect the image capturing device 2' to a computer of the vehicle. The first and the second side of the electrical interface 7 can meet different standards, for example, the FAKRA standard. The connection between the electrical interface 7 and the housing element 2 can be tight. The electrical interface 7 may comprise a cable section, the end of which may be fitted with a connector, in order to facilitate the wiring of the vehicle, in particular, when the optical system must be positioned in a location of the vehicle that is difficult to access.

When the housing element 2 does not provide any electrical interface 7, provision will be made to arrange a passage making it possible to introduce a connection cable that can be plugged directly into an electrical connector of the image capturing device 2' in order to allow the electrical connection of this device to a vehicle computer. It is not necessary for the case of the image capturing device 2' to have an electrical connector, and the device may comprise a connection cable directly connected to the printed circuit carrying the sensor. Also in this case, it is possible to pass the connecting cable through the passage of the housing element 2 in a preparation step of the arrangement 1.

The holding element 3 aims to keep the fluid projection device 3' in a functional position with respect to the image capturing device 2' when the latter is in the mounting position. The fluid projection device 3' has one end for connection to a port for supplying the fluid, and another end or another part forming a nozzle for projecting the fluid. In the functional position, the fluid is effectively and precisely projected by the nozzle onto the optic of the image capturing device 2'. The holding element 3 is able to securely keep the projection device 3' in its functional position. They can, in particular, be secured to one another by clipping.

In certain embodiments, the housing element 2 and the holding element 3 are secured to one another. They can be part of the same main body of the mounting arrangement 1. Such a main body is shown, in particular, in FIG. 4 by way of illustration. This main body may be made of plastic. In a variant of these embodiments, it could be envisaged to form the housing element 2 and the holding element 3 in two parts that are separated, but secured to one another without any degree of freedom, to form the main body.

In order to assemble the optical system to a body element of a vehicle, the mounting arrangement 1 also provides a fastening element 4. This fastening element 4 is intended to receive the housing element 2 and the holding element 3 so that the fluid projection device 3' is disposed in a functional position with respect to the image capturing device 2' when it is in the mounting position. This fastening element 4 can take many forms, as will be presented in the various embodiments of the present description.

The fastening element 4 is configured to assemble the mounting arrangement 1 very simply on the body element, for example, by clipping, snap-fastening, elastic fitting or stapling. This assembly can be reversible or irreversible, that is to say, at least part of the arrangement 1 is retained on the body element by the fastening element 4 without easy disassembly means.

It will be understood that the assembly of the optical system to the body element is particularly facilitated by the proposed arrangement 1. The assembly arrangement 1 can in fact be delivered pre-assembled, that is to say, previously equipped, for example, by clipping or by screwing, with the image capturing device 2' and the projection device 3'. The pre-assembled assembly can be assembled on the body element in a single manual operation, for example, by snap-fastening onto this body element. Once mounted, the image capturing device 2' can be connected to a vehicle computer by simple wired connection of the electrical interface 7 of the housing element 2 or of the electrical connector of the image capturing device 2'. The projection device 3' is in turn connected, on the side of its connection end, to a fluid distribution port.

FIGS. 1a to 1d show a first embodiment of a mounting arrangement 1 according to the present description. The fastening element 4 here is formed by a frame. The central opening of the frame makes it possible to open the optic of the image capturing device. The face of the frame intended to be positioned against the body element 9 carries a plurality of flexible tabs 8, the ends of which respectively carry holding notches.

The body element 9 is in turn provided with openings 8' arranged to be placed so as to correspond with the flexible tabs 8 of the fastening element 4. These openings are crossed by side members on which the holding notches can be closed and thus allow the fastening of the fastening element 4 to the body element 9.

Figure 1A:
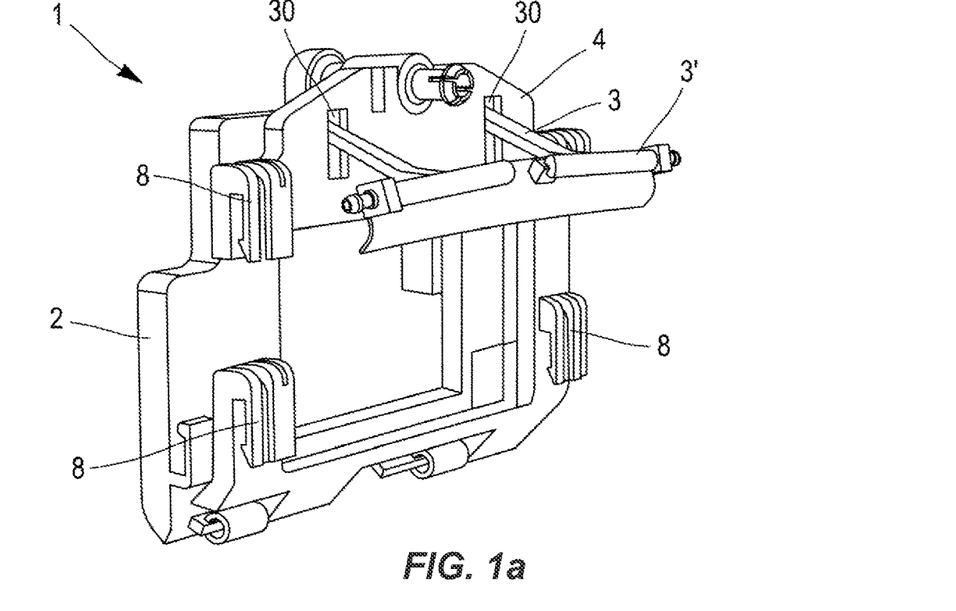
FIGS. 1a to 1d show a mounting arrangement according to a first embodiment.
Figure 1B:
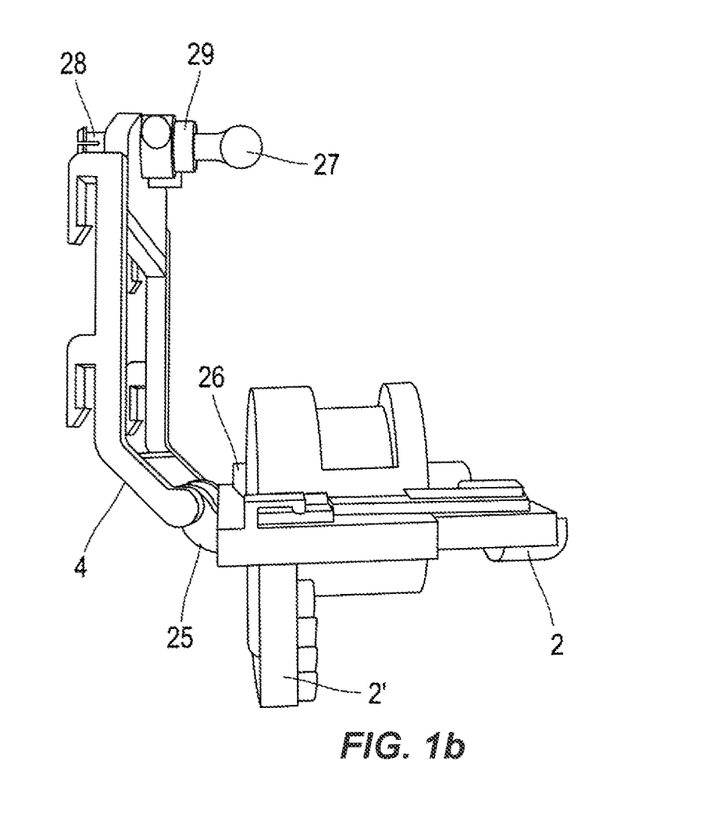
Figure 1C:
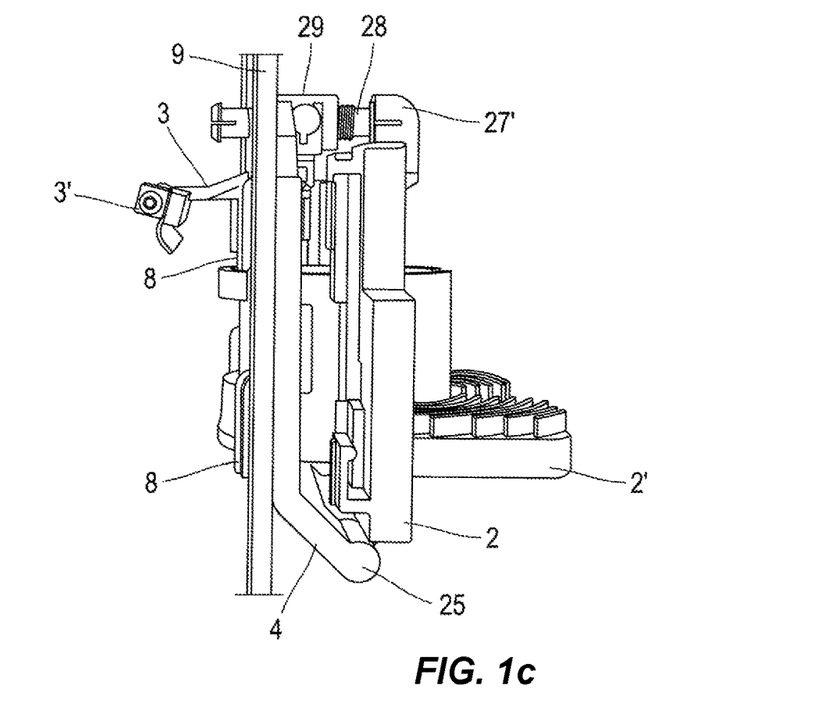
Figure 1D:
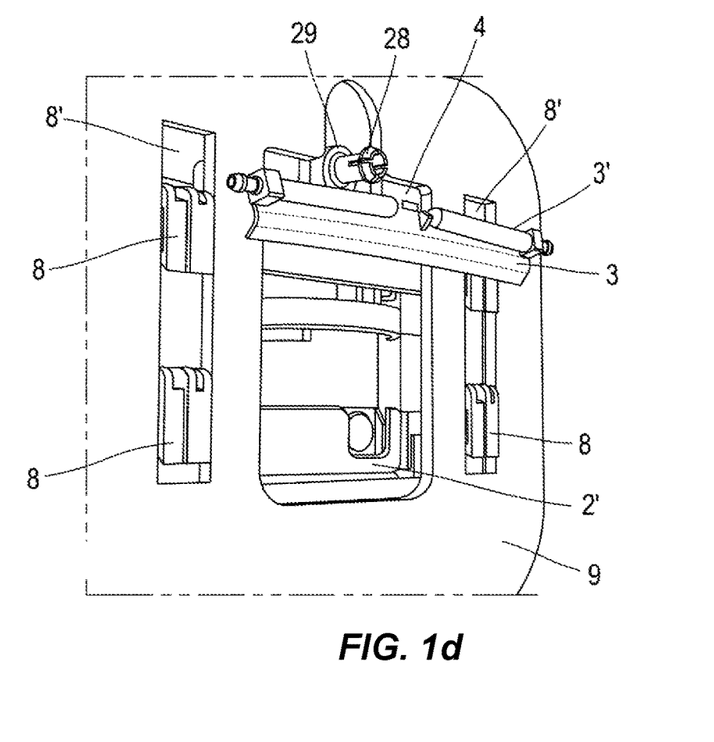

In this embodiment, the housing element 2 also comprises a frame, connected to the frame forming the fastening element 4 by a hinge 25 extending on a respective side of each frame. When the two frames are moved away from each other, by rotation of the hinge 25 as shown in FIG. 1b, the image capturing device 2' can be accommodated in the central opening of the frame forming the housing element 2. Side extensions of the case of the image capturing device 2' may rest on some of the sides of the frame constituting the housing element 2 in order to allow them to be fastened to one another. It is thus possible to screw the housing element 2 onto the frame or, as shown in FIG. 1b, to clip the image capturing device 2' to flexible tabs 26 arranged on at least one of the sides of the housing element 2.

After this step of positioning the image capturing device 2' in the housing element 2, the hinge 25 can again be actuated to close the housing element 2 on the fastening element 4. In this closed position, the optic of the image capturing device 2' emerges from the frame forming the fastening element 4 to engage in, or be disposed opposite, the opening provided in the body element 9.

The fastening element 4 carries a sphere 27, here on the side of the frame opposite the side on which the hinge 25 is made. The sphere 27 is intended to snap into place and to be housed in a flexible receiving part 27' of the housing element 2, in order to hold these two parts together in the closed position of the hinge 25. The holding force of the sphere 27 in the receiving part 27' is such that when the mounting arrangement 1 receives a significant frontal impact, that is to say, directed perpendicular to the plane defined by the frame of the fastening element 4, the sphere 27 can be dislodged from the receiving part, allowing the rotation of the hinge 25 and the retracted positioning of the image capturing device 2'. This limits the risk of damage to this device when the vehicle on which the mounting arrangement 1 is placed undergoes an accident.

The sphere 27 is capable of rotating in the receiving part 27'. It is placed at the end of an adjusting screw 28 passing through a threaded nut 29 carried by the fastening element 4. The free end of this screw 28, that is to say, the end not carrying the sphere 27, is shaped to be handled by a tool. By rotating the adjusting screw 28, the sphere 27 is moved in translation along the axis of the adjusting screw 28, and the housing element 2 is angularly displaced with respect to the fastening element 4 by rotation around the hinge 25.

This mechanism makes it possible to adjust the position of the image capturing device 2', which makes this embodiment particularly advantageous. Of course, the body element 9 has a main opening shaped to make the free end of the adjusting screw 28 accessible.

The sphere 27, the flexible receiving part 27' and the adjusting screw 28 thus form a removable adjustment device for orienting the housing element 2 (and therefore the image capturing device 2') with respect to the fastening element 4 at a determined angle.

The holding element 3 of this embodiment consists of a transverse arm also carrying flexible tabs configured to engage on notches 30 formed on an upper side of the frame forming the fastening element 4. The arm here carries two ports, forming the fluid projection device 3', each port being provided in its length with a plurality of holes oriented toward the inside of the frame intended to receive the optic of the image capturing device 2'. These holes form nozzles making it possible to project a fluid in the direction of this optic in order to clean the surface thereof. The ports have a first closed end, and a second end that can be connected to the fluid distribution ports of the vehicle.

When the arm forming the holding element 3 has a transverse dimension greater than the dimension of the opening of the body element, this holding element 3 is secured to the fastening element 4, after the latter has been fastened to the body element 9. Preferably, however, the transverse dimension of the arm will be adjusted so that it is smaller than this opening, and so that the mounting arrangement 1 can be fastened entirely pre-displayed on the body element 9.

FIGS. 2a to 2d show a mounting arrangement 1 according to another embodiment. In this embodiment, the housing element 2 is secured to the holding element 3 and together they constitute a main body. The fastening element 4 here comprises an intermediate part 14 fastened in a reversible manner to the main body. In the example shown in FIG. 2a, this intermediate part is formed by two parts 14a, 14b that are interconnected by a connecting ring 14c and arranged on either side of this ring 14c.

The connecting ring 14c avoids masking the optic of the image capturing device 2' when the latter is placed in the mounting position in the housing element 2.

The outer surfaces of two opposite walls of the housing element 2 carry rails 17 in which the two parts 14a, 14b of the intermediate part 14 can slide. These rails 17 can have side openings 16 in which lugs 15 placed laterally on the parts 14a, 14b can engage in order to assemble the intermediate part 14 to the main body and to fix their relative position.

The intermediate part 14 is provided with two feet 18 respectively carried by the two parts 14a, 14b, each foot 18 receiving a metal clip 15' in the form of a ring. These clips in the form of rings 15', once securely positioned on the feet 18, are configured to cooperate with holding elements 9 arranged on the body element of the vehicle, so as to fasten the intermediate part 14 to this element in a non-reversible manner. As is well known per se, each metal clip 15' can comprise a projecting claw that can be introduced into the holding element 9, but which blocks its removal.

Figure 2B:
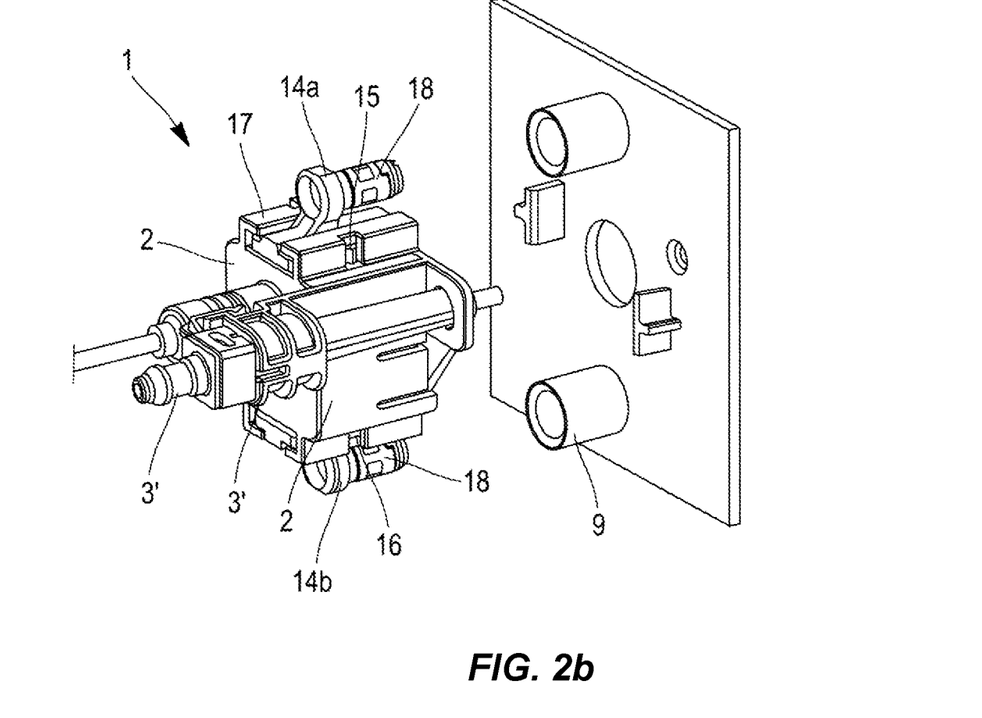
Figure 2C:
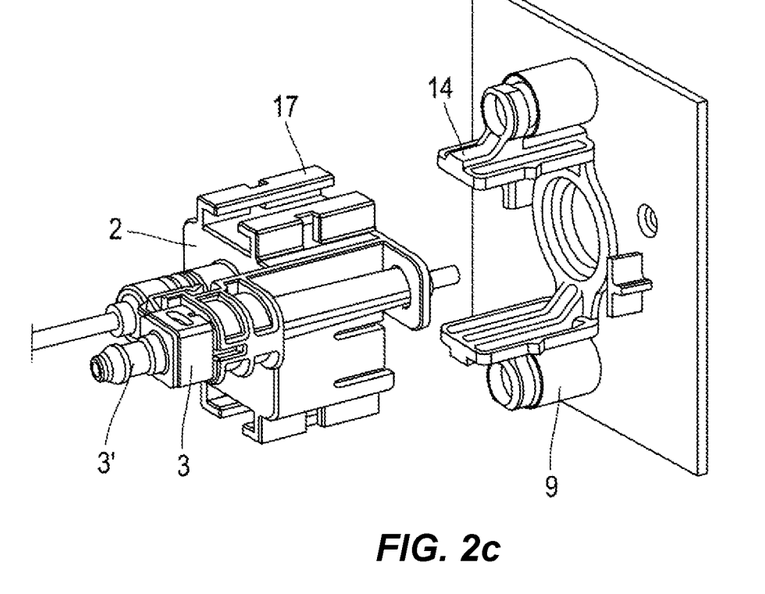

The mounting arrangement 1 according to this embodiment can be originally delivered pre-assembled, that is to say, by having previously fastened the projection device 3' and the image capturing device 2' on the main body and having placed the intermediate part 14 provided with the metal clips 15' on the main body. This assembly can be mounted in a single step on the body element by stapling it to the holding elements 9 of the vehicle (FIG. 2*b*). If it is necessary to disassemble the optical system, the main body can be slid to separate it from the intermediate part 14 via the rails 17. The intermediate part 14 remains irreversibly fastened to the body element (FIG. 2*c*).

Figure 2D:
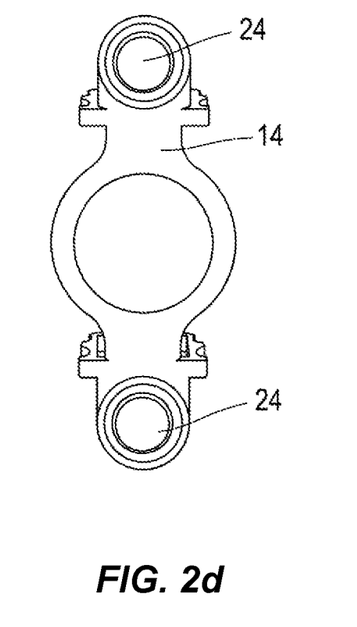

In a variant of this embodiment shown in FIG. 2*d*, the fastening element 4 can be formed by an adhesive material 24 disposed on the intermediate part 14; this adhesive material 24 can, for example, be activated by heating in order to fasten the intermediate part 14 irreversibly to the body element.

FIGS. 3*a* to 3*d* show a mounting arrangement 1 according to another embodiment. In this embodiment, the fastening element 4 and the holding element 3 are both carried by an intermediate part 19, this intermediate part 19 being fastened in a reversible manner to the housing element 2 and in an irreversible manner to a holding element 9 of the body element.

In this embodiment, the relative angular position of the housing element 2 can be adjusted with respect to the intermediate part 19. It is therefore possible, after mounting the mounting arrangement 1, to precisely adjust the orientation of the optic of the image capturing device 2', which can be important when the optical field is relatively narrow, as can be the case for LIDAR-type devices.

The intermediate part 19 carries three notched wheels 20, each wheel 20 having a central bore. These bores are configured to receive inserts 21, for example, plastic inserts, bearing ring-shaped metal clips 15' on their outer surface. These inserts 21 also have an axial recess carrying an internal thread. The ends of the inserts 21 that emerge from the notched wheels 20 are introduced into holding elements 9 of the body element in order to irreversibly fasten the intermediate part 19 carrying the holding element 3 and the projection device therein 3'. In an alternative, it could also be considered to fasten the intermediate part 19 to the body element by means of an adhesive material. In this case, the inserts 21 would not be necessary, and the internal thread would be carried through the central bore of the wheels 20.

The housing element 2 is in turn reversibly coupled to the intermediate part 19 by means of a plurality of swivel parts 22, three in the illustrated example, to be respectively associated with the notched wheels 20.

Figure 3D:
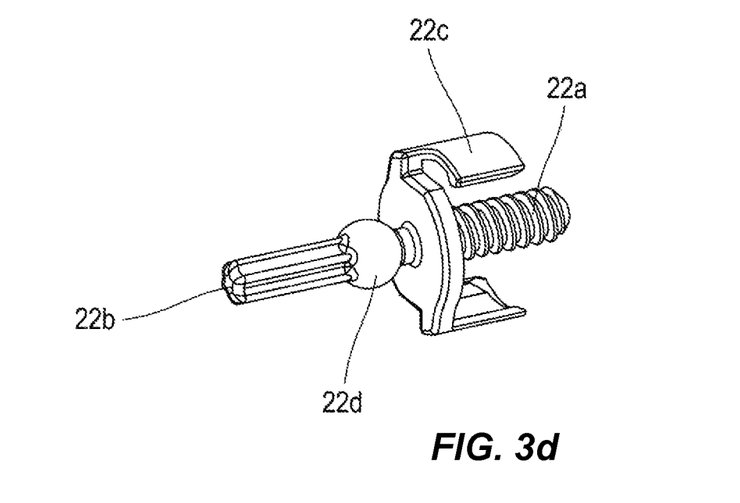

Each swivel part 22, as is clearly visible in FIG. 3*d*, is formed by a central axis, a first end 22*a* of which carries an external thread configured to cooperate with the internal thread of the axial recess of an insert 21. A flexible part 22*c* of the swivel part 22 cooperates with the notches of a wheel 20 to allow the angular position of the swivel part 22 to be indexed with respect to the wheel 20, and therefore with respect to the progression by screwing of the swivel part 22 in the insert 21. The other end 22*b* of the central axis enters an opening made on the housing element 2. The opening makes the end 22*b* of the axis accessible from the outside, which can be shaped to be manipulated in rotation by a tool.

The central axis also carries a spherical ball joint 22*d*, which is configured to clip into a clipping housing 23 of the housing element 2 to secure this housing element to the swivel parts 22 and therefore to the intermediate part 19.

The swivel parts 22 can thus be driven in rotation, the movement and angular position of which is indexed by the flexible part 22*c* housed in the notches of the wheels 20. The progression by screwing of a swivel part 22 into an insert 21 causes the displacement of the housing element 2 by rotation about an axis passing through the other two swivel parts 22. Advantageously, the three notched wheels 20, the central bores of which define three fastening points of the housing element 2, will be placed on the surface of the intermediate part 19 so that they form a right triangle. The toothed wheel 20 and the swivel part 22 arranged at the right angle of this triangle constitute a pivot fastening point, the other two notched wheel—swivel part pairs then making it possible to orient the housing element 2 (and therefore the image capturing device 2') angularly and respectively along two axes that are perpendicular to one another.

It is noted that these elements for adjusting the angular position of the housing element 2 are completely compatible with the previous embodiment in which the housing element 2 and the holding element 3, which are secured with one another, were associated with an intermediate part 14.

Of course, the present disclosure is not limited to the embodiments described and it is possible to add variants without departing from the scope of the invention as defined by the claims.

The invention claimed is:

1. An arrangement for mounting an optical system on a body element of a vehicle, the optical system comprising an image capturing device comprising a case and a device for projecting a fluid for cleaning the image capturing device, the case retaining an optic, the case comprising and protecting a sensor arranged on a printed circuit and carrying an electrical connector electrically connected to a printed circuit, the arrangement comprising:

an adjustable housing element for holding the case of the image capturing device in the mounting position;
   a holding element of the fluid projection device; and
   a fastening element, on which the housing element and the holding element are mounted so that the fluid projection device is arranged in a functional position with respect to the image capturing device when the image capturing device is in the mounting position, wherein the fastening element is configured to be fastened to the body element of the vehicle; and
   wherein the housing element has a side wall and at least one flexible tab disposed on the side wall, the flexible tab having a free end bearing a notch, the flexible tab configured to deform to allow introduction of the image capturing device in the housing element and to close the notch thereon when the image capturing device is disposed in the mounting position.

2. The arrangement of claim 1, wherein the housing element and the holding element form a main body.

3. The arrangement of claim 2, wherein the fastening element is carried by an intermediate part fastened in a reversible manner to the main body.

4. The arrangement of claim 3, wherein the intermediate part comprises two parts connected by a connecting ring, each part of the two parts being configured to slide in an assembly rail on the main body.

5. The arrangement of claim 1, wherein the fastening element and the holding element are carried by an intermediate part reversibly fastened to the housing element.

6. The arrangement of claim 5, wherein the intermediate part is irreversibly fastened to the body element.

7. The arrangement of claim 6, wherein the fastening element comprises a plurality of metal clips configured to cooperate with holding elements on the body element of the vehicle.

8. The arrangement of claim 6, wherein the fastening element comprises an adhesive material disposed on the intermediate part.

9. The arrangement of claim 5, wherein the intermediate part comprises elements for adjusting the angular position of the housing element.

10. The arrangement of claim 1, wherein the housing element and the fastening element are connected via a hinge.

11. The arrangement of claim 10, further comprising a removable adjustment device for orienting the housing element at a determined angle with respect to the fastening element.

12. The arrangement of claim 1, wherein the housing element includes an electrical interface configured to couple with an electrical connector of the image capturing device when the image capturing device is in the mounting position.

13. The arrangement of claim 12, wherein the housing element has a bottom and the electrical interface comprises a connector disposed on the bottom of the housing element.

14. The arrangement of claim 3, wherein the intermediate part is irreversibly fastened to the body element.

15. The arrangement of claim 3, wherein the intermediate part comprises elements for adjusting the angular position of the housing element.

* * * * *